Nov. 5, 1935.  R. K. HOPKINS  2,019,971
ARC WELDING MACHINE
Filed May 11, 1932
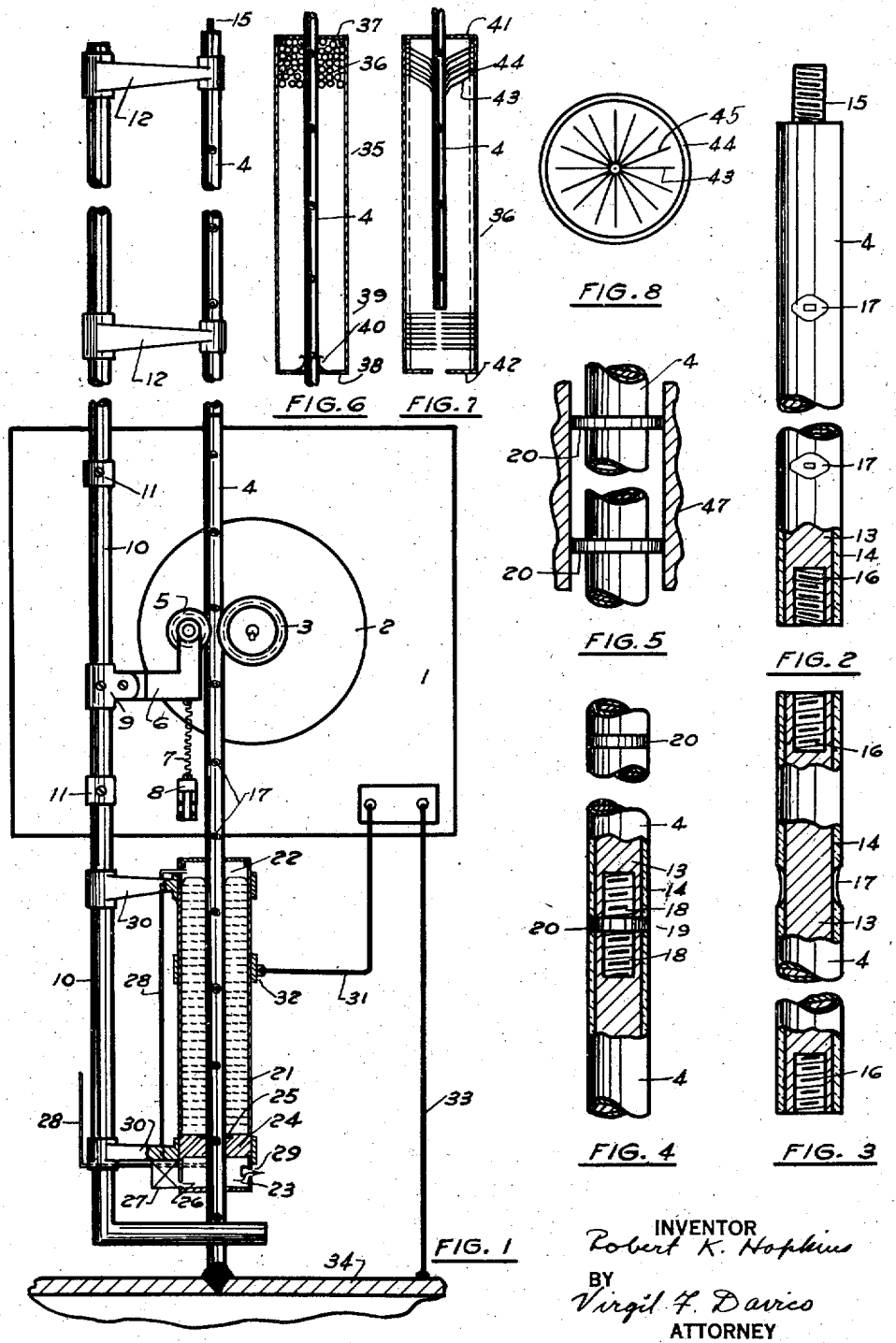
INVENTOR
Robert K. Hopkins
BY
Virgil F. Davies
ATTORNEY Patented Nov. 5, 1935

2,019,971

UNITED STATES PATENT OFFICE 2,019,971

ARC WELDING MACHINE

Robert K. Hopkins, New York, N. Y., assignor to The M. W. Kellogg Co., New York, N. Y., a corporation of Delaware Application May 11, 1932, Serial No. 610,555

12 Claims. (Cl. 219—8)

This invention relates in general to arc-welding and in particular to arc-welding by the use of ceramic or other non-conducting material covered welding electrode.

The advantages resulting from the use of ceramic or other non-conducting material covered electrode in arc-welding are well established, however, due to the fact that the covering is non-conducting, it has not been possible heretofore to arc-weld with covered electrodes without a considerable wastage of electrode material and undue prolongation of the operating time.

The machines at present used for arc-welding with covered electrodes generally include a welding current carrying welding head to which a bare end of the electrode is fastened. The welding head is actuated and controlled to carry the electrode to the arc in a manner to maintain an arc of desired character. When an electrode is consumed, the welding head must be returned to its original position for removal of the remainder of the used electrode and fastening in place a new one. As the welding heads move at the same maximum speed in either direction, at least one-half of the operating time is used in the backing up of the welding head and changing electrode. The fact that the arc is interrupted periodically for the reasons mentioned prevents the obtaining of a homogeneous and continuous weld.

Since the current is passed to the electrode through a fixed point, the heating of the upper portion, unless the length is kept comparatively short, is sometimes so excessive as to disintegrate the coating before it reaches the arc. Even if comparatively short lengths of electrode are used, since the welding head cannot be brought too close to the arc, a portion of the electrode must be wasted.

My invention contemplates apparatus for carrying on arc-welding with a non-conducting material covered welding electrode as a continuous operation without any wastage of electrode material.

In accordance with my invention, a covered electrode of indefinite length is provided which is made up of an indefinite number of easily joined sections and which exposes at spaced intervals contact areas through which the welding current can be passed to the arc. Apparatus is provided for feeding the electrode to the arc and the feed is controlled in a known manner to maintain an arc of desired character. The electrode on its way to the arc is passed through a device which defines a contact region of extended length for continuously, or substantially continuously contacting with each of the contact areas passing therethrough to thereby pass the welding current from a source of supply to the conducting core of the electrode.

The particular nature of the invention, as well as other objects and advantages thereof, will appear most clearly by reference to the accompanying drawing, wherein, Figure 1 is a front elevation, partly in section, of an arc-welding machine embodying my invention, Figures 2, 3, 4, and 5 are part sectional views of preferred forms of welding electrode, Figure 6 is a sectional view of a second preferred form of the contact device of my invention, Figure 7 is a sectional view of another preferred form of the contact device, and Figure 8 is a plan view of a contact disc.

Referring to the drawing:

The welding current generator, the control means therefor, as well as the welding electrode oscillating motor, etc., which per se form no part of this invention, will for the purpose of this description be considered as located in rear of the panel 1, with the welding electrode oscillating motor mounted to oscillate panel 1. A welding electrode feeding motor 2, the control means of which (not shown) is located at the rear of panel 1, is mounted on panel 1 to oscillate therewith. A grooved wheel 3 is keyed to the shaft of motor 2 and engages a portion of the bottom section of the welding electrode 4. The diametrically opposite portion of welding electrode 4 is engaged by a grooved wheel 5 which is mounted in a pivoted bracket 6. A spring 7 has one end anchored in a loop at the bottom of bracket 6, its other end being anchored in a loop on a bracket 8, which is bolted or otherwise fastened to panel 1. Spring 7 constantly urges wheel 5 into contact with welding electrode 4 and causes it to bear against wheel 3 with sufficient pressure to prevent slippage. The contact portions of wheels 3 and 5 are made of fibre or some such material to prevent damage to the electrode covering as welding electrode 4 passes between them.

The member 9 supports the pivot of bracket 6 and is fastened to an L-shaped guide member 10 which is in turn fastened by means of brackets 11 to panel 1 to oscillate therewith. The upper portion of guide member 10 has fastened thereto spaced guide brackets 12 through which pass the sections of the welding electrodes 4 on their way to wheels 3 and 5. The lower portion of guide member 10 is provided with a guide hole through which passes the welding electrode 4 as it approaches the arc.

The welding electrode 4 is made up of an indefinite number of sections, that is to say, as one section is consumed, another is added to the remaining section, or sections, and this procedure continued indefinitely. Each section comprises a metallic core 13 about which is formed a covering 14 of ceramic or other non-conducting material. Each end of each section is provided with part of a joint forming means. The joint forming means used must be such that the sections may be easily and quickly joined and the joint must be sufficiently strong to support the weight of the welding electrode 4 below the wheels 3 and 5, also it must give a sufficiently intimate metal to metal contact to allow the passage of the necessary welding current. In addition, the joint must be such that there is not a substantial gap between the end of one section and the beginning of the next.

Figures 1 and 2 show the sections provided with male members 15 and female members 16 of a threaded joint and Figures 3 and 4 show the sections provided at each end with female members 16 of a threaded joint. The sections of electrode 4 shown in Figures 4 and 5 being joined by screwing adjacent ends on the threaded studs 18 of joint forming member 19. Member 19 besides threaded studs 18 includes a disc 20 of substantially the diameter of electrode 4.

To provide for the passage of the welding current from the current supply to the metallic core 13 of the welding electrode 4, shown in Figures 1, 2, 3, 6, and 7, portions of the covering 14, equally spaced apart along the length of the electrode 4, are ground out or otherwise removed to expose or substantially expose small areas of the metallic core 13. The voids 17 in electrode covering 14 thus produced approximate a frustrum of a cone in shape and as best shown in Figures 2 and 3, expose but a small portion of the electrode core 13 while they allow ready access for contact therewith. The shape of voids 17 may be varied but to produce the result intended, it is essential that but a small area of the surface of metallic core 13 be exposed and a minimum amount of the circumference of the covering 14 adjacent core be broken. If too much of the circumference of core 13 is exposed, a part of covering 14 immediately below the exposed portion will fall into the crater of the weld as the exposed portion comes into the arc. This covering material might later be covered with metal and thus seriously weaken the weld.

In the form of welding electrode 4 shown in Figures 1, 2, 3, 6, and 7, voids 17 are provided at diametrically opposite portions thereof, at points equally spaced apart along the length thereof. This construction is very satisfactory but the invention is not limited thereto as voids 17 might be made on one side only or staggered. The invention may be practiced successfully with voids 17 unequally spaced apart on electrode 4, but no advantage is gained by such uneven spacing and the manufacture of the welding electrode is unnecessarily complicated.

It is also possible to carry out my invention with electrode 4 of Figure 4. This form of electrode 4 comprises sections whose ceramic covering 14 is entirely unbroken and the ends of adjacent sections are screwed onto the threaded studs 18 of members 19 to form a continuous electrode 4 of indefinite length whose non-conducting surface is periodically interrupted by the conducting surfaces of discs 20. The sections of this form of electrode 4 must be of comparatively short length so that at least one of the discs 20 is at all times in the contact device to be hereinafter described.

Electrode 4, after passing between feed wheel 3 and contact wheel 5 on its way to the arc, passes through a cylindrical container 21, the internal space of which is divided into upper cup 22 and lower cup 23 by partition 24. The length of upper cup 22 must be such that at least one of voids 17 will at all times be therein, preferably the length is made such that a plurality of voids 17 are at all times therein. Upper cup 22 is substantially filled with mercury to conduct the welding current from the walls of container 21 to the areas of core 13 exposed at voids 17.

Partition 24 must be sufficiently thick to at least cover the whole of voids 17 passing therethrough to prevent a flow of mercury from upper cup 22 to lower cup 23. The hole in partition 24 must be of such a size that the mercury will not flow between the sides thereof and the surface of electrode 4 into cups 23. To prevent such a flow, and to obviate the rubbing of the face of electrode 4 on the sides of the hole in partition 24, the hole in partition 24 may be made of a diameter somewhat larger than the diameter of electrode 4 and a gasket 25 of leather or other soft compressible material, having a hole therein of somewhat smaller diameter than the diameter of electrode 4, inset at the top of partition 24. As each of voids 17 passes from upper cup 22 to lower cup 23 a volume of mercury equal to the volume of void 17 passes into lower cup 23. By reason of the sloping bottom of lower cup 23, the mercury passes through port 26 to pump 27 and through pipe 28 to be returned to the top of upper cup 22. To prevent any mercury being carried to the arc by reason of it sticking to the sides of voids 17, a compressed air line 50 enters lower cup 23 at diametrically opposite points to jet blasts of air against voids 17 as they enter lower cup 23. The air is allowed to escape to the atmosphere through a protected port 29.

Container 21 is supported from guide member 10 by suitable brackets 30. The welding current is supplied to container 21 by a cable 31 which connects the welding current generator, not shown, to a band 32 encircling container 21. A cable 33 connects the work 34 to the welding current generator, not shown.

Substances other than mercury, either in the liquid or gaseous form, for instance, low melting point white metal alloys may be used as the contact medium in upper cup 22. If a white metal alloy is used, a heating means such as a resistance coil, not shown, may be provided around or inside of upper cup 22 to supply the heat necessary to maintain the alloy in a molten condition.

If desired, the containers 35 and 36 shown in Figures 6 and 7 may be used in place of container 21. Container 35 is cylindrical and includes a removable cover 37 and a bottom 38. A hole is provided in cover 37 and in bottom 38 to allow the passage of electrode 4 therethrough. The space within container 35 is substantially filled with small copper balls 36 to conduct the welding current from the walls 39 to the exposed portions of electrode 4. Springs 40 are fastened to bottom 38 around the hole therein to bear against electrode 4 passing therethrough to prevent the balls 36 being carried by voids 17 out of container 35. Container 35 is supported from guide member 10 and is supplied with the welding current in the same manner as container 21.

Container 36 is also cylindrical and includes a removable top 41 and a bottom 42. A hole is provided in top 41 and bottom 42, to allow passage of electrode 4 through container 36. To carry the current from the walls of container 36 to the core 13 of electrode 4, contact discs 43 are provided. Discs 43 are closely spaced along the length of container 36 and are separated by metal spacers 44. By screwing down on top 41 spacers 44 and discs 43 are brought into intimate contact with each other and with the walls of container 36. As best shown in Figure 8 discs 43 are radially slotted as at 45 to provide a plurality of resilient leaves. The central hole of discs 43 is somewhat smaller than the diameter of core 13 of electrode 4. If desired the ends of the leaves of discs 43 may be somewhat curved. Container 36 is supported from guide members 10 and is supplied with the welding current in the same manner as container 21.

When the electrode 4 shown in Figures 1, 2, 3, 6, and 7, is used, the electrode 4 is supplied with welding current through the areas of core 13 exposed by the voids 17 passing through container 21, or 35, or 36. When the electrode 4 shown in Figure 4 is used, the electrode 4 is supplied with welding current through discs 20 passing through container 21, or 35, or 36. With either form of electrode 4, the passage of current to the arc is continuous and by adding new sections to electrode 4 as sections are consumed, the welding may be continued indefinitely without interruption due to the necessity of changing electrodes, etc.

The electrode 4, shown in Figure 5, is made up of sections identical with those of electrode 4 of Figure 4, however, the diameter of discs 20 of the members used to connect the sections are greater than the diameter of the sections. With this form of electrode 4, a contact device having continuous solid contact surfaces, for instance such as are defined by members 47, may be used.

While preferred forms of the invention have been shown and described, it is to be understood that the invention may be embodied in other forms and the various changes may be made in the structural details without departing from the principle of the invention as defined in the appended claims.

I claim:

1. In an arc-welding machine adapted to use a welding electrode having a conducting core and a non-conducting covering therefor interrupted at regular intervals to provide current conducting contact areas, welding circuit connections, means defining a substantially continuous contact zone of a length exceeding the distance between a plurality of the contact areas of the welding electrode, means electrically connecting said contact zone defining means to said connections, and means for passing said electrode through said contact zone on its way to the arc.

2. In an arc-welding machine adapted to use a welding electrode having a conducting core and a non-conducting covering therefor interrupted at regular intervals to provide current conducting contact areas, welding circuit connections, a container of a length exceeding the distance between a plurality of the contact areas of the electrode electrically connected to said connections, means for passing the electrode through said container to the arc, and means for passing welding current from said container to said contact areas as said contact areas pass through said container.

3. In an arc-welding machine adapted to use a welding electrode having a conducting core and a non-conducting covering therefor interrupted at regular intervals to provide current conducting contact areas, welding circuit connections, a container of a length exceeding the distance between a plurality of the contact areas of the electrode electrically connected to said generator, means for passing the electrode through said container to the arc, means for passing welding current from said container to said contact areas as said areas pass through said container, and means effective to prevent said current passing means from passing to the arc.

4. In an arc-welding machine having welding circuit connections, a container electrically connected to said connections, means for passing an electrode through said container to the arc, and fluid contact means in said container contacting with said container and the electrode passing therethrough for passing welding current to said electrode.

5. In an arc-welding machine having welding circuit connections, a container electrically connected to said connections, means for passing an electrode through said container to the arc, and conducting spheres substantially filling the space in said container between said container and the electrode passing therethrough for supplying current from said container to said electrode.

6. In an arc-welding machine having welding circuit connections, a container electrically connected to said connections, means for passing an electrode through said container to the arc, and spring contact means closely spaced along the length of said container adapted to contact with said container and the electrode passing therethrough.

7. In an arc-welding machine having welding circuit connections, a container electrically connected to said connections, means for passing an eletrode through said container on its way to the arc, means dividing the internal space of said container into an upper and a lower compartment, fluid contact means in said upper compartment contacting with the container and said electrode passing therethrough, and means associated with said lower compartment for returning to said upper compartment any of said fluid contact means passing from said upper compartment to said lower compartment.

8. In an arc-welding machine adapted to use a welding electrode having a conducting core and a non-conducting covering therefor interrupted at regular intervals to provide current conducting contact areas, welding circuit connections, a container electrically connected to said connections, means for passing the electrode through said container on its way to the arc, means dividing the internal space of said container into an upper and a lower compartment, said upper compartment being of a length exceeding the distance between a plurality of the contact areas of the welding electrode and said dividing means being of a thickness exceeding the length of the interruptions in the non-conducting covering of the welding electrode, fluid contact means in said upper compartment contacting with said container and said electrode passing therethrough, and means associated with said lower compartment for returning to said upper compartment any of said fluid contact means passing from said upper compartment to said lower compartment.

9. In an arc-welding machine adapted to use a welding electrode having a conducting core and a non-conducting covering therefor interrupted at regular intervals to provide current conducting contact areas, welding circuit connections, a container electrically connected to said connections, means for passing the electrode through said container on its way to the arc, means dividing the internal space of said container into an upper and a lower compartment, said upper compartment being of a length exceeding the distance between a plurality of the contact areas of the welding electrode and said dividing means being of a thickness exceeding the length of the interruptions in the non-conducting covering of the welding electrode, fluid contact means in said upper compartment contacting with said container and the electrode passing therethrough, means in said lower compartment adapted to disengage any of said fluid contact means adhering to said electrode as it passes through said lower compartment, and means associated with said lower compartment for returning to said upper compartment any of said fluid contact means passing from said upper compartment to said lower compartment.

10. In an arc welding machine of the character adapted to feed a welding electrode to an arc struck between the welding electrode and the work, welding circuit connections, a container electrically connected to said connections, means for feeding an electrode through said container to the arc, and electrically conductive means in said container adapted to contact with substantially the whole of the surface of the welding electrode passing through said container.

11. In an arc welding machine of the character adapted to feed a welding electrode to an arc struck between the welding electrode and the work, welding circuit connections, a container electrically connected to said connections, means for feeding an electrode through said container to the arc, and electrically conductive means substantially filling said container to contact with substantially all of the welding electrode passing through said container.

12. In an arc welding machine of the character adapted to feed a welding electrode to an arc struck between the welding electrode and the work, welding circuit connections, a container electrically connected to said connections, means for feeding an electrode to the arc, and deformable electrically conductive means substantially filling said container adapted to contact with substantially the whole of the surface of the welding electrode passing through said container.

ROBERT K. HOPKINS.

DISCLAIMER 2,019,971.—*Robert K. Hopkins*, New York, N. Y. ARC WELDING MACHINE. Patent dated November 5, 1935. Disclaimer filed February 3, 1937, by the patentee; the assignee, *The M. W. Kellogg Co.*, concurring.

Hereby enters this disclaimer to claim 1 in said specification.

[*Official Gazette March 2, 1937.*]

9. In an arc-welding machine adapted to use a welding electrode having a conducting core and a non-conducting covering therefor interrupted at regular intervals to provide current conducting contact areas, welding circuit connections, a container electrically connected to said connections, means for passing the electrode through said container on its way to the arc, means dividing the internal space of said container into an upper and a lower compartment, said upper compartment being of a length exceeding the distance between a plurality of the contact areas of the welding electrode and said dividing means being of a thickness exceeding the length of the interruptions in the non-conducting covering of the welding electrode, fluid contact means in said upper compartment contacting with said container and the electrode passing therethrough, means in said lower compartment adapted to disengage any of said fluid contact means adhering to said electrode as it passes through said lower compartment, and means associated with said lower compartment for returning to said upper compartment any of said fluid contact means passing from said upper compartment to said lower compartment.

10. In an arc welding machine of the character adapted to feed a welding electrode to an arc struck between the welding electrode and the work, welding circuit connections, a container electrically connected to said connections, means for feeding an electrode through said container to the arc, and electrically conductive means in said container adapted to contact with substantially the whole of the surface of the welding electrode passing through said container.

11. In an arc welding machine of the character adapted to feed a welding electrode to an arc struck between the welding electrode and the work, welding circuit connections, a container electrically connected to said connections, means for feeding an electrode through said container to the arc, and electrically conductive means substantially filling said container to contact with substantially all of the welding electrode passing through said container.

12. In an arc welding machine of the character adapted to feed a welding electrode to an arc struck between the welding electrode and the work, welding circuit connections, a container electrically connected to said connections, means for feeding an electrode to the arc, and deformable electrically conductive means substantially filling said container adapted to contact with substantially the whole of the surface of the welding electrode passing through said container.

ROBERT K. HOPKINS.

DISCLAIMER 2,019,971.—*Robert K. Hopkins*, New York, N. Y. ARC WELDING MACHINE. Patent dated November 5, 1935. Disclaimer filed February 3, 1937, by the patentee; the assignee, *The M. W. Kellogg Co.*, concurring.

Hereby enters this disclaimer to claim 1 in said specification.

[*Official Gazette March 2, 1937.*]